United States Patent
Karlsson et al.

(10) Patent No.: US 7,131,798 B2
(45) Date of Patent: Nov. 7, 2006

(54) COUNTERSINK FOR CHIP REMOVING MACHINING TOOL

(75) Inventors: Ronny Karlsson, Valdemarsvik (SE); Alain Freyermuth, Pfaffenhoffen (FR)

(73) Assignee: Seco Tools AB, Fagersta (SE)

( * ) Notice: Subject to any disclaimer, the term of this patent is extended or adjusted under 35 U.S.C. 154(b) by 266 days.

(21) Appl. No.: 10/878,053

(22) Filed: Jun. 29, 2004

(65) Prior Publication Data

US 2005/0047882 A1 Mar. 3, 2005

(30) Foreign Application Priority Data

Jul. 3, 2003 (SE) .................................... 0301962

(51) Int. Cl.
*B23B 51/08* (2006.01)
*B23B 51/10* (2006.01)

(52) U.S. Cl. .................... 408/191; 408/118; 408/181; 408/224

(58) Field of Classification Search ................ 408/36, 408/117, 118, 181, 184, 185, 189, 190, 191, 408/193, 197, 224, 225, 713; 407/37, 45
See application file for complete search history.

(56) References Cited

U.S. PATENT DOCUMENTS

| | | | |
|---|---|---|---|
| 2,042,081 A | | 5/1936 | Van Deusen et al. |
| 3,726,352 A | | 4/1973 | Olov Roos |
| 3,794,438 A | * | 2/1974 | Knutsson .................... 408/231 |
| 4,171,656 A | | 10/1979 | Gargrave |
| 4,197,042 A | | 4/1980 | Krhounek et al. |
| 4,353,670 A | | 10/1982 | Jorgensen |
| 4,533,285 A | * | 8/1985 | Jorgensen .................... 408/191 |
| 4,610,285 A | | 9/1986 | Derivaz |
| 4,611,959 A | | 9/1986 | Kress et al. |
| 4,693,641 A | | 9/1987 | Tsujimura et al. |
| 5,071,295 A | * | 12/1991 | Greig .......................... 279/156 |
| 5,265,988 A | | 11/1993 | Schmigalla et al. |
| 5,914,895 A | | 6/1999 | Jenne |
| 5,915,895 A | | 6/1999 | Jager et al. |
| 6,595,729 B1 | * | 7/2003 | Karlsson ....................... 408/118 |
| 2004/0057804 A1 | * | 3/2004 | Jager et al. ................... 408/224 |
| 2005/0019119 A1 | * | 1/2005 | Jager ............................ 408/191 |

FOREIGN PATENT DOCUMENTS

| | | | |
|---|---|---|---|
| DE | 3125480 A1 | * | 1/1983 |
| DE | 3610016 A1 | * | 10/1987 |
| DE | 90 04 316 | | 8/1990 |
| DE | 4012067 A1 | * | 10/1991 |
| DE | 92 06 148 | | 9/1992 |
| EP | 0 146 030 B1 | | 6/1985 |
| EP | 0 248 775 B1 | | 12/1987 |

(Continued)

*Primary Examiner*—Daniel W. Howell
(74) *Attorney, Agent, or Firm*—Drinker Biddle & Reath LLP

(57) ABSTRACT

A tool for chip removing machining includes a drill and a countersink mounted to the drill. The drill includes a protruding land and at least one chip flute. The countersink includes a body, a plurality of inserts received in respective insert pockets formed in the body, and a plurality of clamps for fixing respective inserts in the pockets. In order to be able to adjust the location of the inserts, pins are arranged for displacement relative to the body. The pins are slidably disposed in holes formed in the body, and adjustment screws are mounted in the body and arranged to displace a respective pin and the associated clamp and cutting insert in response to movement of the adjustment screw.

14 Claims, 4 Drawing Sheets

FOREIGN PATENT DOCUMENTS

| | | | |
|---|---|---|---|
| EP | 684099 A1 * 11/1995 | WO | WO 8700100 A1 * 1/1987 |
| FR | 598473 12/1925 | WO | WO 95/07787 3/1995 |

* cited by examiner

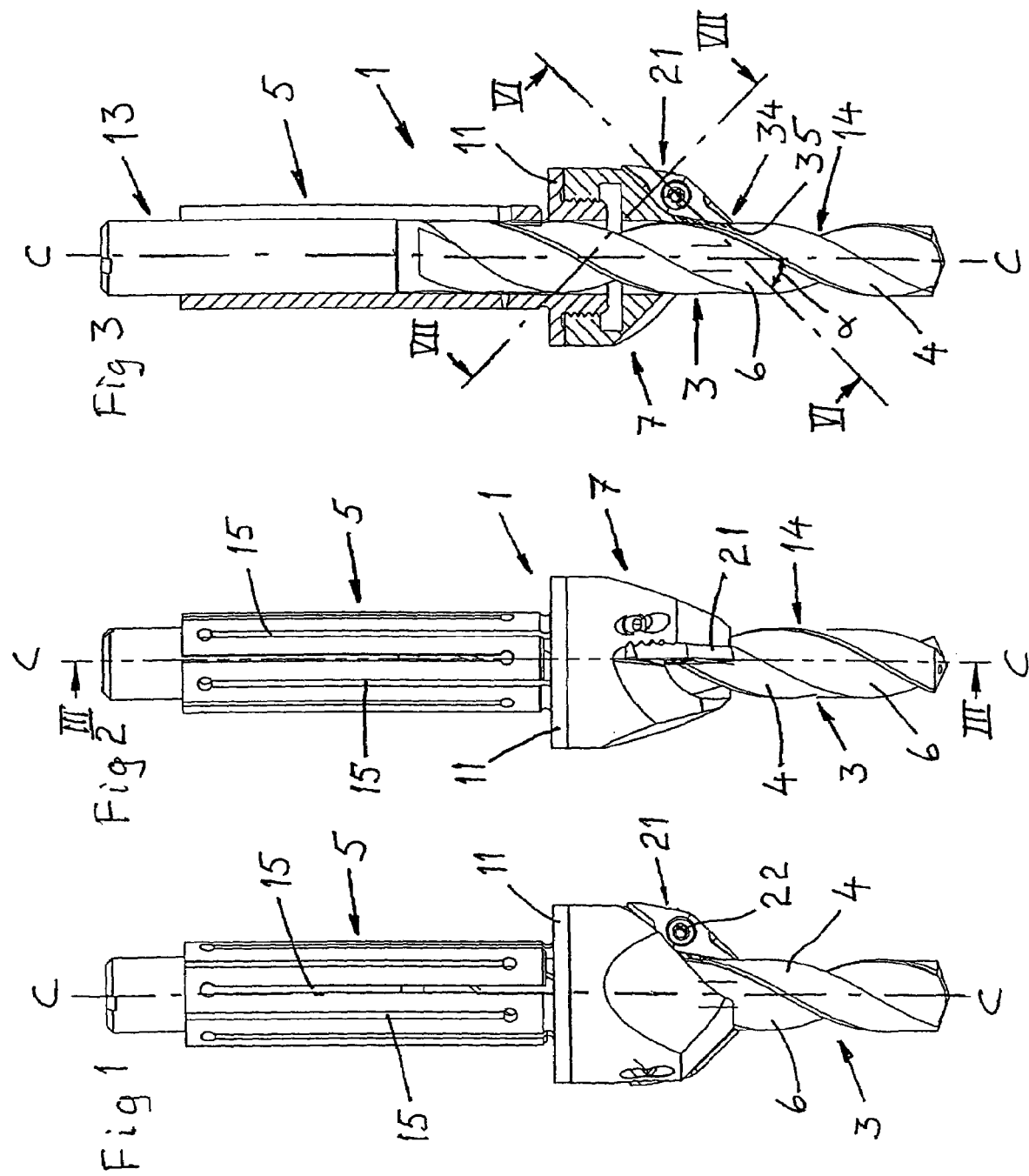

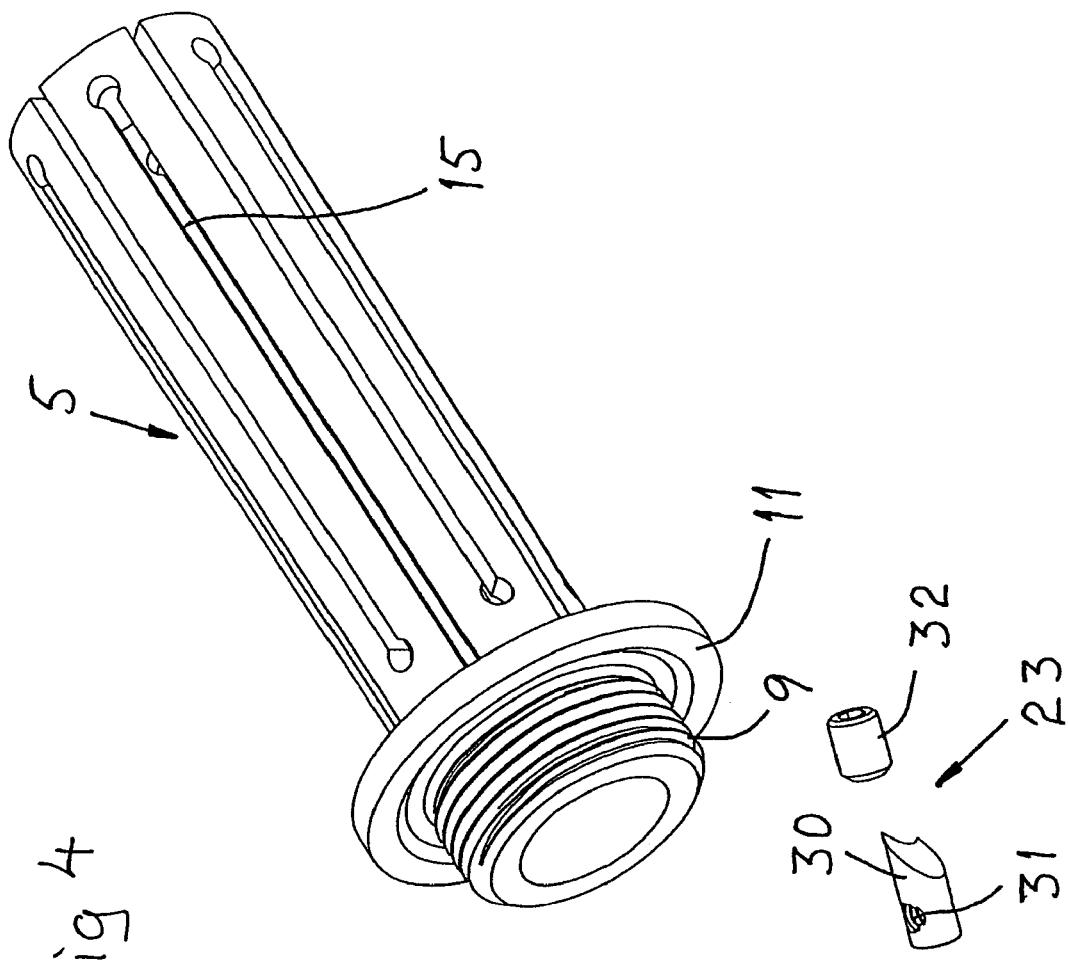
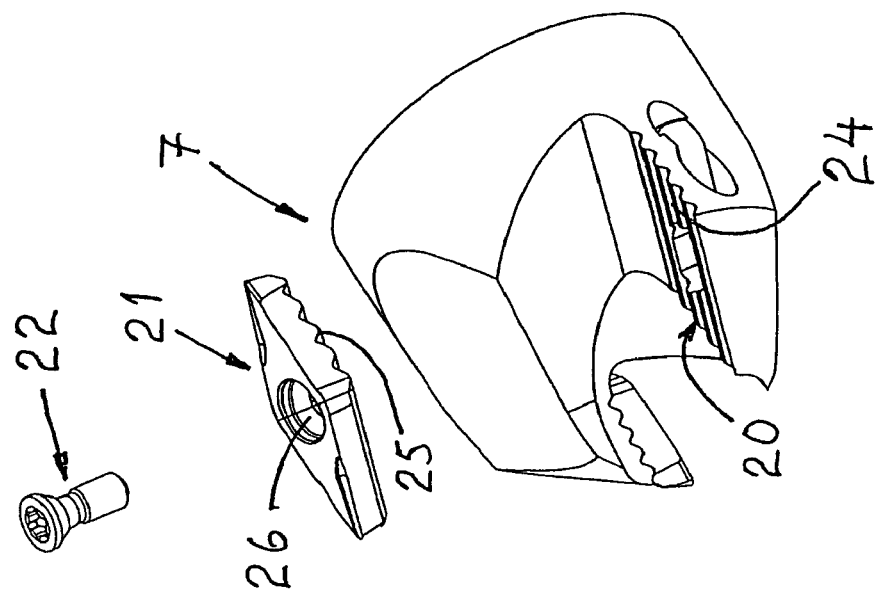
Fig 4

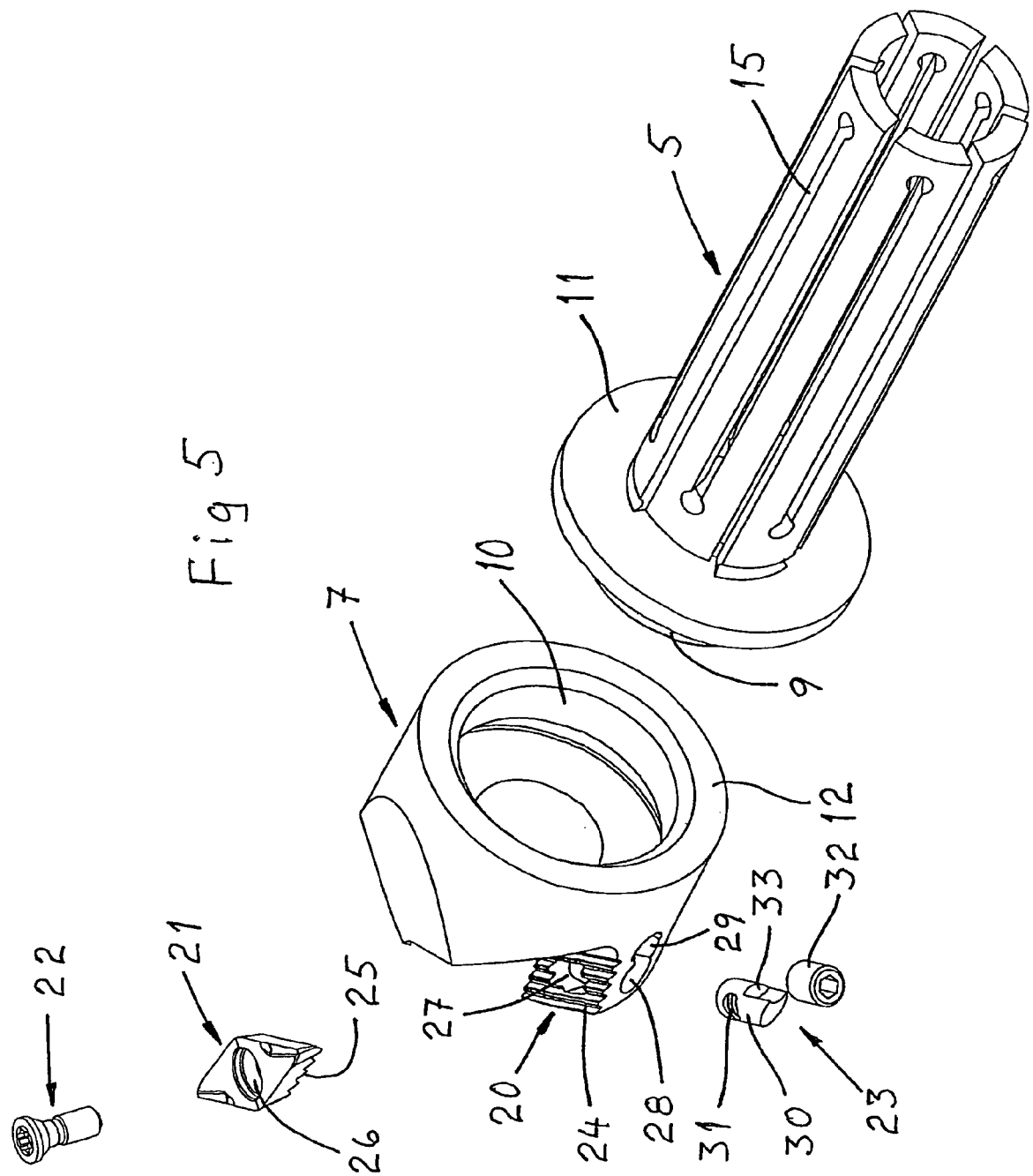

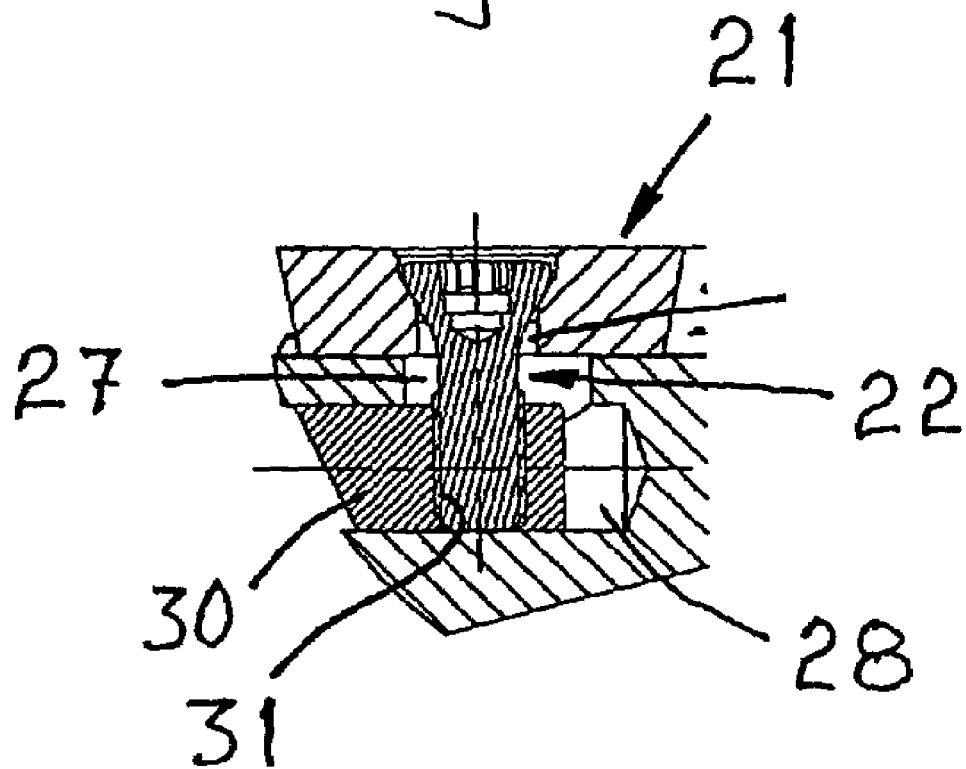
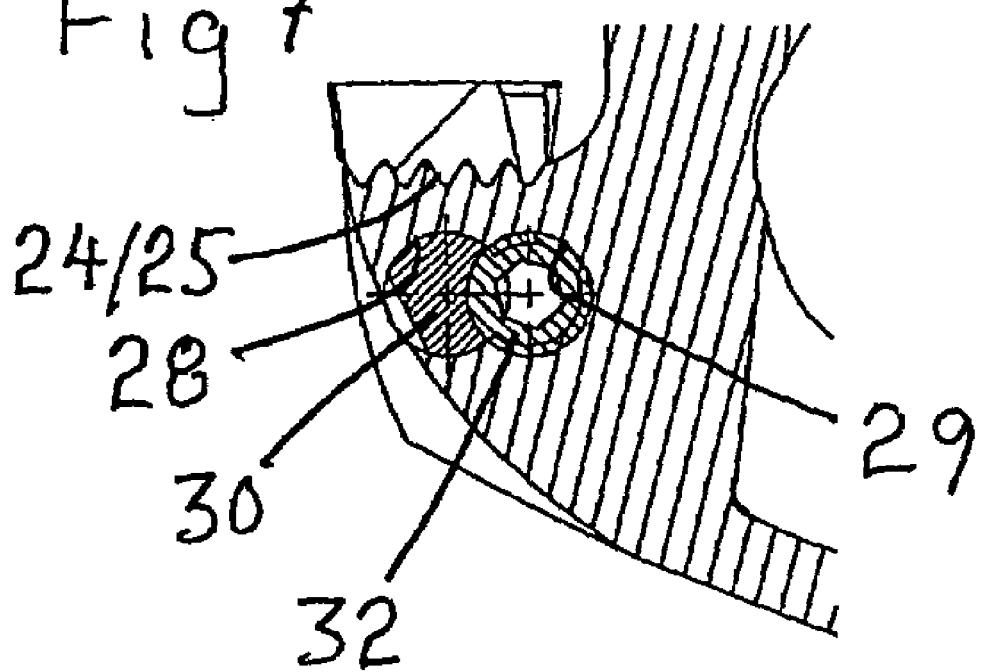

COUNTERSINK FOR CHIP REMOVING MACHINING TOOL

This application claims priority under 35 U.S.C. §§119 and/or 365 to Patent Application Ser. No. 0301962-7, filed in Sweden on Jul. 3, 2003, the entire content of which is hereby incorporated by reference.

BACKGROUND OF THE INVENTION

The present invention relates to a tool and a countersink for chip removing machining.

Through U.S. Pat. No. 5,915,895 there is previously known a tool for drilling and chamfering, wherein the tool comprises a base body, in which a drill is received. At the end of the base body situated closest to the drill tip, means are provided in order to achieve chamfering. These means are made of specially designed cutting inserts that are fixed on the base body via a screw and clamp combination. The tool according to U.S. Pat. No. 5,915,895 does not have any arrangement for precisely adjusting the positions of the cutting inserts.

Through U.S. Pat. No. 5,265,988 there is previously known a tool for drilling and chamfering, wherein the tool comprises a tool holder having a chamfering head at its forward end, where two cutting blades are held, diagonally opposite to each other. A drill with a shank portion is received in the tool holder. The cutting blades are held by screw and clamp combination. The cutting blades are received in grooves that form a certain angle with the axis of rotation of the tool, wherein the cutting blades are adjustable in grooves in connection with that it is mounted on the chamfering head. The tool according to U.S. Pat. No. 5,265,988 does not have any arrangement for precisely adjusting the positions of the cutting blades.

WO 95/07787 shows a tool for chip removing machining. The known tool comprises cutting inserts that are intended to perform an additional machining operation, for example chamfering or countersinking. The tool has means for adjusting the positions of the cutting inserts. These means comprise a slide with a oblong hole, carrying a cutting insert. The slide can be displaced relative to a locking screw, which fixes the slide in position. The displacement of the slide occurs wholly manually.

OBJECTS OF THE INVENTION

A primary object of the present invention is to provide a tool of the above-captioned type, which tool enables a precise adjustment of the cutting inserts forming a parts of the countersink to the actual operative diameter of the standard drill forming a part of the tool.

Another object of the present invention is to simplify the mounting of the countersink on the drill.

Still another object of the present invention is to achieve an infinitely variable adjustment of the cutting inserts producing the chamfer.

Still another object of the present invention is to achieve an infinitely variable adjustment of the drill depth.

At least the primary object of the present invention is realized by a countersink adapted to be mounted on a shank of a drill. The countersink comprises a body forming at least one of insert pocket, a cutting insert received in the insert pocket, and a clamp for fixing the insert in the pocket. In addition, a slide is arranged for displacement relative to the body for displacing the clamp. An adjustment screw is mounted in the body to displace the slide and the clamp and its cutting insert. The invention also pertains to the combination of a drill and the countersink mounted thereto.

BRIEF DESCRIPTION OF THE DRAWINGS

Below an embodiment of the invention will be described with reference to the enclosed drawings, wherein:

FIG. 1 shows a side view of a tool according to the present invention;

FIG. 2 shows a side view of the tool according to FIG. 1, however the tool being rotated 90° around its axis of rotation as compared with FIG. 1;

FIG. 3 shows a cross-section along the line III—III in FIG. 2;

FIG. 4 shows an exploded view in perspective, obliquely from the front, of the countersink forming a part of the tool according to the present invention;

FIG. 5 shows an exploded view in perspective, obliquely from behind of the countersink forming a part of the tool according to the present invention;

FIG. 6 shows a cross-section along the line VI—VI in FIG. 3, and

FIG. 7 shows a cross-section along the line VII—VII in FIG. 3.

DESCRIPTION OF A PREFERRED EMBODIMENT

The tool according to the present invention shown in FIGS. 1–3 comprises a countersink 1, which is mounted on a drill 3, which may be of standard configuration. In the shown embodiment the drill 3 is a helix drill, which has at least one protruding land 4 and a chip flute 6.

The countersink 1 forming a part of the tool according to the present invention is shown in FIGS. 1–3 and in FIGS. 4 and 5. The countersink 1 comprises an anchoring portion 5 and an insert-receiving portion 7, wherein the anchoring portion 5 is provided with a male thread 9 while the insert-receiving portion 7 is provided with a female thread 10. The male thread 9 and the female thread 10 can be brought into engagement with each other to form a thread joint.

A collar 11 is provided in connection with the male thread 9, wherein this collar 11 will get into abutment against an end surface 12 of the insert-receiving portion 7. Thereby, a connection is achieved between the anchoring portion 5 and the insert-receiving portion 7, which can receive relatively large bending stresses.

The anchoring portion 5 is generally designed as a sleeve, which is intended to be placed over a shank portion 13, see FIG. 3, of the drill 3 that also comprises a hole-making portion 14. Along the greater part of its length the anchoring portion 5 is provided with slots 15 that open alternately into the opposite ends of the anchoring portion wherein some of the slots 5 extend forwardly to the collar 11, and the other slots open into a rear free end of the anchoring portion. The provision of slots 15 makes the anchoring portion 5 somewhat flexible, which facilitates attachment of the anchoring portion 5 on the shank portion 13 of the drill 3. By dividing the countersink 1 into an anchoring portion 3 and an insert-receiving portion 7, adaptation can be made to different combinations of diameters of the shank portion 13 and the hole-making portion 14.

The insert-receiving portion 7 comprises: two insert pockets 20 for a cutting insert for chip removing machining, two cutting inserts 21 provided in these insert pockets, first means 22 for clamping the cutting inserts 21 in the insert pockets 20, and second means 23 for adjusting the positions of the cutting inserts 21 in their respective insert pockets 20, as will be explained. In order to impart to the tool a symmetrical counterbalance, the insert pockets 20 are placed diametrically opposed with regard to the axis C—C of rotation of the tool. In the shown embodiment the insert pockets 20 are provided with first serrations 24 and the lower side of the cutting inserts 21 are provided with second serrations 25, wherein the first serrations 24 and the second serrations 25 come into engagement with each other (intermesh) when a cutting insert 21 is placed in its associated cutting insert pocket 20. The longitudinal direction of the first serrations 24 that coincides with the cross-sectional line VI—VI in FIG. 3, slopes at a certain acute angle α relative to the axis C—C of rotation of the tool.

The first means for clamping a cutting insert 21 in its associated cutting insert pocket 20 is according to the shown embodiment comprises a clamp in the form of a center screw 22, which is received by a center hole 26 of the cutting Insert 21. Each insert pocket 20 is also provided with a through-going first hole 27, through which the center screw 22 passes when it is in an active (cutting) position.

Second means 23 for adjusting the cutting insert 21 position in its respective insert pocket 20 is provided in connection with each insert pocket 20. Each second means 23 in the shown embodiment comprises two second and third holes 28 and 29 arranged beside each other in the insert-receiving portion 7. The holes 28 and 29 are provided in immediate connection with the associated insert pocket 20 and each has an extension parallel to the longitudinal direction of the first serrations 24. The second hole 28 is not threaded while the third hole 29 is threaded. In FIG. 6 can be seen the second hole 28, in which a slide in the form of, e.g. a pin 30, is received, said pin 30 having a threaded, through-going fourth hole 31 extending laterally to the longitudinal direction of the pin 30. The mutual dimensions of the second hole 28 and the pin 30 are such that the pin 30 is displaceable in the second hole 28, i.e., a slide fit is present between the second hole 28 and the pin 30. The fourth hole 31 is intended to cooperate with the center screw 22, i.e. the center screw 22 can be threaded into the fourth hole 31. An adjustment screw or adjustment member 32, which likewise forms a part of the means for adjusting the position of the cutting insert 21 in its respective insert pocket 20, is received in the third hole 29 and cooperates with a surface 33 of the pin 30 that extends generally laterally of the longitudinal direction of the in 30.

When a cutting insert 21 shall be fixed in its associated cutting insert pocket 20, see FIGS. 6 and 7, the cutting insert 21 is placed in the insert pocket 20, whereby the first and second serrations 24, 25 are brought into engagement with each other. The center screw 22 is received in the center hole 26 of the cutting insert 21, whereafter it extends through the first hole 27 in the insert pocket 20 and forms a thread joint with the fourth hole 31 in the pin 30, which is arranged in the second hole 28. Also the adjustment screw 32 is placed in the third hole 29, whereby the adjustment screw 32 is brought to abutment against the lateral surface 33 of the pin 30. Initially, a complete tightening of the center screw 22 is not performed, which enables the pin 30 to be displaced by the adjustment screw 32 being rotated in its threaded third hole 29. Thereby, a fine adjustment of the position of the cutting insert 21 in the insert pocket 20 is made possible, such that displacement of the cutting insert 21 thereby occurs in the longitudinal direction of the serrations 24, 25. When the final position of the cutting insert 21 has been reached, the cutting insert 21 is fixed by further tightening the center screw 22. Thereby, the displaceable member 30 is developed to be brought into a force transmitting engagement with the second means 22 for fixing the cutting insert 21.

Consequently, the tool according to the present invention comprises the above-described countersink 1 and the drill 3, on which the countersink 1 is mounted. Thereby, the anchoring portion 5 of the countersink 1 is provided on the shank portion 13 of the drill 3, wherein the shaping of the anchoring portion 5 as a slotted sleeve enables the countersink 1 to be easily mounted on the drill 3 and be displaced in the longitudinal direction of the drill 3. Thereby it is made sure that the nose of the cutting insert 21 facing towards the drill 3 tip is situated in the area of the protruding land 4 of the drill 3, i.e. one nose 34 of the cutting insert 21 abuts against the protruding land 4 of the drill 3 (see FIG. 3), which thus constitutes a stop abutment for the cutting insert 21. In order to still improve cooperation between the cutting insert 21 and the drill 3, the cutting insert 21 is provided with a chamfer 35 in the area of the cutting insert 21 which is intended to abut against the protruding land 4 of the drill 3. The chamfer 35 has an axial dimension that is substantially parallel with the axial extension of the protruding land 4. The abutment of the cutting insert 21 against the drill 3 contributes to some degree to the stability of the free end of the drill.

The anchoring portion 5 can be displaced in axial direction relative to the drill 3 by having a flexible anchorage on the shank portion 13 of the anchoring portion 5, whereby the drill depth easily can be varied. Upon this displacement, the nose 34 of the cutting insert 21 facing towards the drill 3 tip is positioned against a protruding land 4 of the drill 3. During use of the tool according to the present invention both the anchoring portion 5 and the internally located shank portion 13 are provided in a chuck or similar. The slots 15 of the anchoring portion 5 thereby bring about that the anchoring portion 5 and the shank portion 13 will become rigid in the rotational direction relative to each other.

After performing drilling and chamfering of a number of holes normally there is a need to exchange drill. Then the anchoring portion 5 and the shank portion 13 are loosened from the chuck. Then the center screw 22 and the associated adjustment means 31, 32 for the respective cutting insert 21 are loosened, thereby allowing the cutting inserts to be pushed away from the drill 3 such that the drill can be dismounted from the countersink 1. A new drill 3 is then mounted in the countersink 1, whereafter the cutting inserts are tightened again and are brought to abutment against the drill 3 in the above-described manner. After finely adjusting the positions of the cutting inserts 21, the tool according to the present invention is again ready to be used.

Conceivable Modifications of the Invention

In the above-described embodiment of the tool, the countersink 1 is mounted on a helix drill 3, which seems be the most preferred combination. However, one may within the limits of the present invention also imagine the countersink 1 being mounted on another type of drill.

In the above-described embodiment, the center screws 22 clamp the cutting inserts 21. Within the scope of the invention, one can however imagine the cutting inserts being clamped by an alternative type of clamp, wherein in an exemplifying but not limiting purpose, top clamps can be mentioned as performing that function. The top clamp would press against the top of the insert by actuation of a screw, but the screw would not extend through the insert itself.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A countersink adapted to be mounted on a shank of a drill, the countersink comprising:
   a body forming at least one insert pocket,
   a cutting insert secured in the at least one insert pocket by a clamp,
   a slide mounted in the body for displacement relative thereto, with the clamp operably connected to the slide for displacement therewith, and
   an adjustment screw threadedly mounted in the body for movement relative thereto and arranged to displace the slide along with the clamp and the at least one cutting insert.

2. The countersink according to claim 1 wherein the at least one pocket comprises a plurality of pockets with respective cutting inserts secured therein.

3. The countersink according to claim 2 further including a plurality of clamps, slides, and adjustment screws for respective cutting inserts.

4. The countersink according to claim 1 wherein the clamp comprises a screw mounted in a threaded hole formed in the slide.

5. The countersink according to claim 4 wherein the at least one insert and its pocket include intermeshing serrations.

6. The countersink according to claim 4 further including an anchoring sleeve having slots rendering the sleeve flexible, the sleeve adapted to receive a shank of a drill.

7. The countersink according to claim 6 wherein the anchoring sleeve is removable connected to the body.

8. The countersink according to claim 6 wherein the anchoring sleeve is removably connected to the body by a threaded connection.

9. A tool for chip removing machining, comprising a drill and a countersink mounted thereto,
   the drill comprising a protruding land and at least one chip flute;
   the countersink comprising:
   a body forming a plurality of insert pockets,
   cutting inserts received in respective insert pockets,
   a plurality of clamps for fixing respective inserts in their respective pockets,
   slides arranged for displacement relative to the body in respective first holes formed in the body, the slides being arranged for displacing respective clamps relative to the body, and
   adjustment screws mounted in respective threaded second holes formed in the body, each adjustment screw arranged to displace a respective slide along with the clamp and cutting insert in response to movement of the adjustment screw.

10. The tool according to claim 9 wherein the clamp comprises a screw mounted in a threaded third hole formed in the slide.

11. The tool according to claim 10 wherein each insert pocket and its respective insert have intermeshing serrations.

12. The tool according to claim 10 wherein the countersink further includes an anchoring sleeve having slots rendering the sleeve flexible, the sleeve receiving a shank portion of the drill.

13. The tool according to claim 12 wherein the anchoring sleeve is removably attached to the body.

14. The tool according to claim 9 wherein each insert contacts the protruding land of the drill for stability.

* * * * *